United States Patent
Davidson et al.

(10) Patent No.: US 6,718,403 B2
(45) Date of Patent: Apr. 6, 2004

(54) HIERARCHICAL SELECTION OF DIRECT AND INDIRECT COUNTING EVENTS IN A PERFORMANCE MONITOR UNIT

(75) Inventors: Joel Roger Davidson, Austin, TX (US); Judith E. K. Laurens, Bastrop, TX (US); Alexander Erik Mericas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 09/734,116

(22) Filed: Dec. 11, 2000

(65) Prior Publication Data

US 2002/0073255 A1 Jun. 13, 2002

(51) Int. Cl.[7] .............................. G06E 3/00; G06E 11/00
(52) U.S. Cl. ............................................. 710/19; 714/25
(58) Field of Search .............................. 710/19; 714/31, 714/39, 47, 48, 25, 57, 38, 45; 712/227

(56) References Cited

U.S. PATENT DOCUMENTS 6,195,748 B1 * 2/2001 Chrysos et al. ............. 712/227
6,282,673 B1 * 8/2001 Liu et al. ...................... 714/25

* cited by examiner

*Primary Examiner*—Khanh Dang
(74) *Attorney, Agent, or Firm*—Joseph P. Lally; Mark E. McBurney

(57) ABSTRACT

A microprocessor including a performance monitor unit is disclosed. The performance monitor unit includes a set of performance monitor counters and a corresponding set of control circuits and programmable control registers. The performance monitor unit receives a first set of event signals from functional units of the processor. Each of the first set of events is routed directly from the appropriate functional unit to the performance monitor unit. The performance monitor unit further receives at least a second set of event signals. In one embodiment, the second set of event signals is received via a performance monitor bus of the processor. The performance monitor bus is typically a shared bus that may receive signals from any of the functional units of the processor. The functional units may include multiplexing circuitry that determines which of the functional units has mastership of the shared bus. Whereas the performance monitor unit is typically capable of monitoring the direct event signals in any of its counters, the indirect event signals may be selectively routed to the counters. The shared bus may be divided into sub-groups or byte lanes where the byte lanes are selectively routed to the set of performance monitor counters. The state of a control register may determine the event that is monitored in the corresponding counter. In one embodiment, the control register provides a set of signals that are connected to the select inputs of one or more multiplexers. The multiplexers receive multiple events signals and, based on the state of their select signals, route one of the received event signals to the corresponding performance monitor counter. Specified states of the select signals may result in the disabling of the corresponding counter or enabling the counter to count system clock cycles rather than any performance event.

20 Claims, 4 Drawing Sheets

HIERARCHICAL SELECTION OF DIRECT AND INDIRECT COUNTING EVENTS IN A PERFORMANCE MONITOR UNIT

BACKGROUND

1. Field of the Present Invention

The present invention generally relates to the field of microprocessors and more particularly to a microprocessor including a performance monitor unit that uses a shared bus in conjunction with dedicated performance events signals to permit the monitoring of a wide variety of performance events while conserving the area of the layout.

2. History of Related Art

In the field of microprocessor based data processing systems, system developers strive to optimize performance and achieve the most efficient system design. Developers typically study the manner in which software programs execute instructions and access the memory hierarchy to determine the efficiency of a particular design. To aid this study, performance monitoring is typically employed. A performance monitor is generally regarded as a facility incorporated into a processor to monitor selected characteristics to assist in the debugging and analyzing of systems. Performance monitors determine machine state at a particular point in time. Often, the performance monitor produces information relating to the utilization of a processor's instruction execution and storage control. As an example, a performance monitor can be used to proceed information regarding the amount of time that has passed between events in a processing system.

SUMMARY OF THE INVENTION

The problems identified above are in large part addressed by a microprocessor that includes a performance monitor unit. The performance monitor unit includes a set of performance monitor counters and a corresponding set of control circuits and programmable control registers. The performance monitor unit receives a first set of event signals from functional units of the processor. Each of the first set of events is routed directly from the appropriate functional unit to the performance monitor unit. The performance monitor unit further receives at least a second set of event signals. In one embodiment, the second set of event signals is received via a performance monitor bus of the processor. The performance monitor bus is typically a shared bus that may receive signals from any of the functional units of the processor. The functional units may include multiplexing circuitry that determines which of the functional units has mastership of the shared bus. Whereas the performance monitor unit is typically capable of monitoring the direct event signals in any of its counters, the indirect event signals may be selectively routed to the counters. The shared bus may be divided into subgroups or byte lanes where the byte lanes are selectively routed to the set of performance monitor counters. The state of a control register may determine the event that is monitored in the corresponding counter. In one embodiment, the control register provides a set of signals connected to the select inputs of one or more multiplexers. The multiplexers receive multiple events signals and, based on the state of their select signals, route one of the received event signals to the corresponding performance monitor counter. Specified states of the select signals may result in the disabling of the corresponding counter or enabling the counter to count system clock cycles rather than any performance event.

BRIEF DESCRIPTION OF THE DRAWINGS

Other objects and advantages of the invention will become apparent upon reading the following detailed description and upon reference to the accompanying drawings in which.

Figure 1:
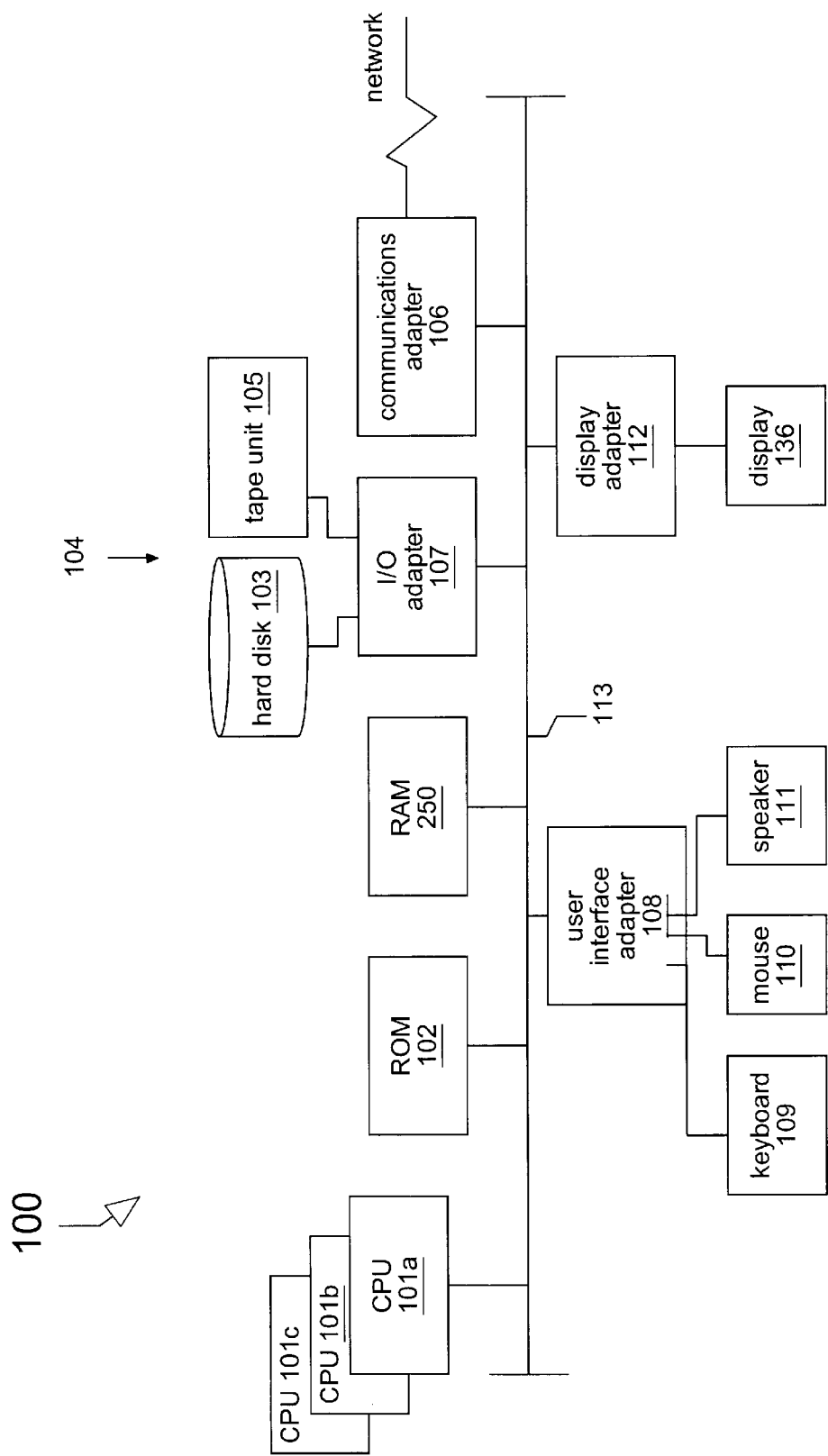
FIG. 1 is a block diagram of a data processing system according to one embodiment of the invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Referring now to FIG 1, an embodiment of a data processing system 100 according to the present invention is depicted. System 100 has one or more central processing units (processors) 101a, 101b, 101c, etc. (collectively or generically referred to as processor(s) 101. In one embodiment, each processor 101 may comprise a reduced instruction set computer (RISC) microprocessor. Additional information concerning RISC processors in general is available in C. May et al. Ed., *PowerPC Architecture: A Specification for a New Family of RISC Processors*, (Morgan Kaufmann, 1994 2d edition). Processors 101 are coupled to system memory 250 and various other components via system bus 113. Read only memory (ROM) 102 is coupled to the system bus 113 and may include a basic input/output system (BIOS), which controls certain basic functions of system 100. FIG 1 further depicts an I/O adapter 107 and a network adapter 106 coupled to the system bus 113. I/O adapter 107 may be a small computer system interface (SCSI) adapter that communicates with a hard disk 103 and/or tape storage drive 105. I/O adapter 107, hard disk 103, and tape storage device 105 are collectively referred to herein as mass storage 104. A network adapter 106 interconnects bus 113 with an outside network enabling data processing system 100 to communicate with other such systems. Display monitor 136 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O busses for connecting peripheral devices such as hard disk controllers, network adapters, and graphics adapters include the Peripheral Components Interface (PCI) bus according to PCI Local Bus Specification Rev. 2.2 available from the PCI Special Interest Group, Hillsboro Oreg., and incorporated by reference herein. Additional input/output devices are shown as connected to system bus 113 via user interface adapter 108 and display adapter 112. A keyboard 109, mouse 110, and speaker 111 all interconnected to bus 113 via user intetface adapter 108, which may include, for example, a SuperI/O chip integrating multiple device adapters into a single integrated circuit. For additional information concerning one such chip, the reader is referred to the *PC87338/PC97338 ACPI 1.0 and PC98/99 Compliant SuperI/O* data sheet from National Semiconductor Corporation (November 1998) at www.national.com. Thus, as configured FIG. 1, system 100 includes processing means in the form of processors 101, storage means including system memory 250 and mass storage 104, input means such as keyboard 109 and mouse 110, and output means including speaker 111 and display 136. In one embodiment a portion of system memory 250 and mass storage 104 collectively store an operating system such as the AIX® operating system from IBM Corporation to coordinate the functions of the various components shown in FIG 1. Additional detail concerning the AIX operating system is available in *AIX Version* 4.3 *Technical Reference: Base Operating System and Extensions, Volumes* 1 *and* 2 (order numbers SC23-3159 and SC23-3160); *AIX Version* 4.3 *System User's Guide: Communications and Networks* (order number SC23-3122); and *AIX Version* 4.3 *System User's Guide: Operating System and Devices* (order number SC23-3121) from IBM Corporation at www.ibm.com and incorporated by reference herein.

Figure 2:
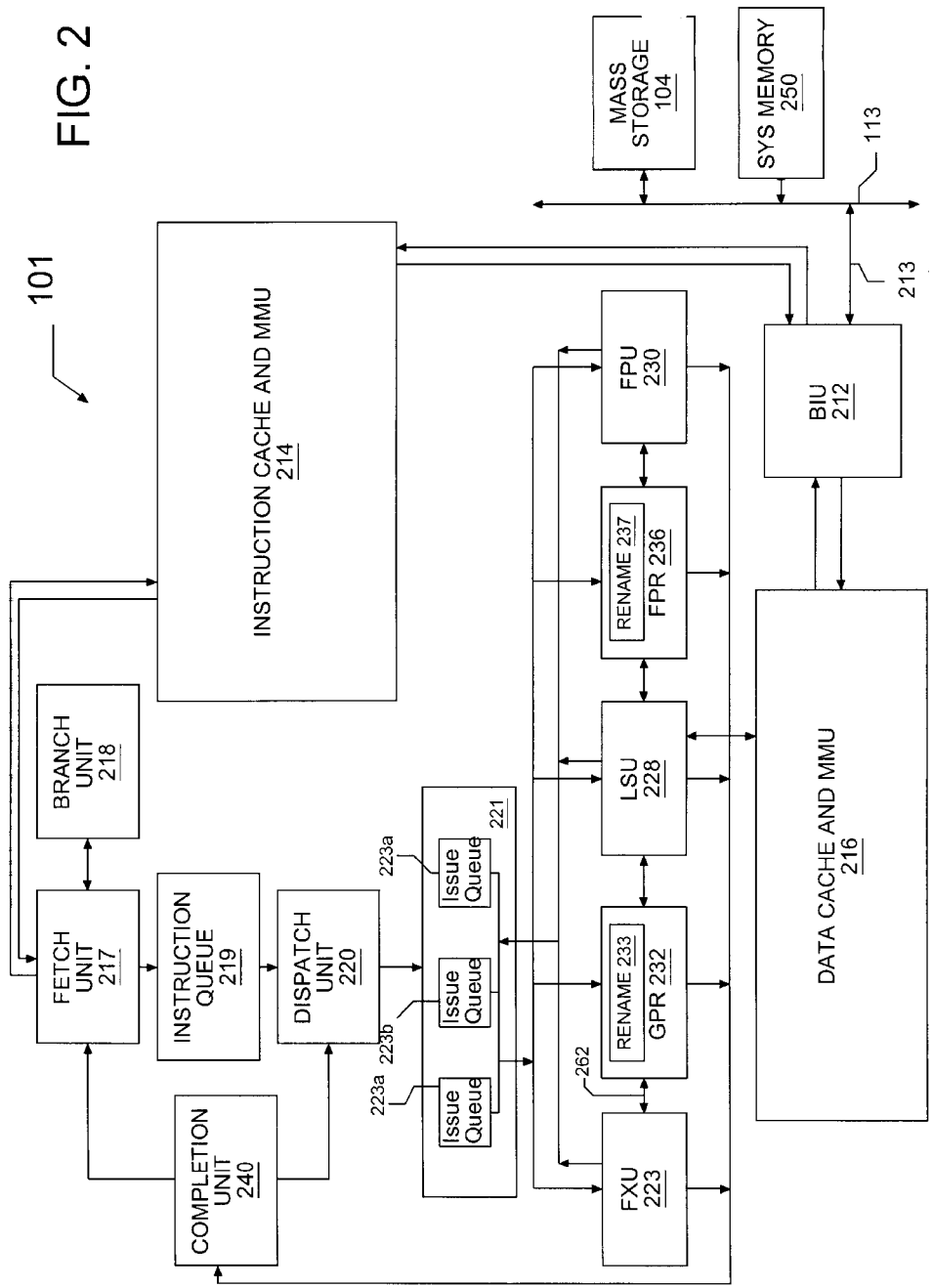
FIG. 2 is a block diagram of a processor suitable for use in the data processing system of FIG. 1.

Turning now to FIG. 2, a simplified block diagram of an embodiment of processor 101 suitable for use in system 100 is presented. In the depicted embodiment, processor 101 comprises an integrated circuit superscalar microprocessor fabricated on a monolithic semiconductor substrate. Processor 101 includes various execution units, registers, buffers, memories, and other functional units as discussed in greater detail below. As illustrated in FIG. 2, processor 101 is coupled to system bus 113 via bus interface unit (BIU) 212 and processor bus 213, which like system bus 113 includes address, data, and control buses. BIU 212 controls the transfer of information between processor 101 and other devices coupled to system bus 113, such as system memory 250 and mass storage 104. It will be appreciated that processor 101 may include other devices coupled to system bus 113 that are not necessary for an understanding of the following description and are accordingly omitted for the sake of simplicity.

BIU 212 is connected to instruction cache and memory management unit 214 and data cache and memory management unit 216 within processor 101. High-speed caches, such as those within instruction cache 214 and data cache 216, enable processor 101 to achieve relatively fast access times to a subset of data or instructions previously transferred from system memory 250, thus improving the speed of operation of data processing system 100. Data and instructions stored within data cache 216 and instruction cache 214, respectively, are identified and accessed by address tags, each comprising a selected number of bits (typically the high-order bits) of the system memory physical address in which the data or instruction reside. Sequential fetch unit 217 retrieves instructions for execution from instruction cache 214 during each clock cycle. In one embodiment, if sequential fetch unit 217 retrieves a branch instruction from instruction cache 214 the branch instruction is forwarded to branch processing unit (BPU) 218 for execution. Sequential fetch unit 217 forwards non-branch instructions to an instruction queue 219, where the instructions are stored temporarily pending execution by other functional units of processor 101. A dispatch unit 220 is responsible for retrieving stored instructions from queue 219 and forwarding the instructions to an issue unit (ISU) 221. Dispatch unit 220 schedules dispatch of instructions to issue unit 221 based, in part, on instruction completion information received from a completion unit 240. The depicted embodiment of ISU 221 includes one or more issue queues 222a, 222b, 222c, etc. (collectively or generically referred to issues queue(s) 222). ISU 221 is responsible for maintaining fully loaded pipelines by issuing new instructions in each cycle to the execution units whenever possible. In one embodiment, instructions are issued from ISU 221 out-of-order.

In the depicted embodiment, the execution circuitry of processor 101, in addition to BPU 218, includes multiple functional units for executing sequential instructions, including fixed-point-unit (FXU) 223, load/store unit (LSU) 228, and floating-point unit (FPU) 230. Each of execution units 223, 228 and 230 typically executes one or more instructions of a particular type of sequential instruction during each processor cycle. For example, FXU 223 performs fixed-point mathematical and logical operations such as addition, subtraction, ANDing, ORing, and XORing, utilizing source operands received from specified general purpose registers (GPRs) 232. Following the execution of a fixed-point instruction, FXU 223 outputs the data results of the instruction to GPR buffers 232, which provide storage for the result received on result bus 262. The FPU 230 typically performs single and double-precision floating-point arithmetic and logical operations, such as floating-point multiplication and division, on source operands received from floating-point registers (FPRs) 236. FPU 230 outputs data resulting from the execution of floating-point instructions to selected FPR buffers 236, which store the result data. As its name implies, LSU 228 typically executes floating-point and fixed-point load instructions, which load data from data cache 216, a lower level cache memory (not depicted), or system memory 250 into selected GPRs 232 or FPRs 236 and floating-point and fixed-point store instructions, which store data from a selected one of GPRs 232 or FPRs 236 to data cache 216 and, ultimately, to system memory 250.

In the preferred embodiment, processor 101 employs both pipelining and out-of-order execution of instructions to further improve the performance of its superscalar architecture. Accordingly, instructions can be executed by FXU 223, LSU 228, and FPU 230 in an order that varies from the original program order of the instructions as long as data dependencies are observed. In addition, instructions are processed by each of FXU 223, LSU 228, and FPU 230 as a sequence of pipeline stages. In one embodiment, processor 101 includes five distinct pipeline stages, namely, fetch, decode/dispatch, execute, finish, and completion.

During the fetch stage, sequential fetch unit 217 retrieves one or more non-branch instructions from instruction cache 214 and stores the fetched instructions within instruction queue 219. In contrast, sequential fetch unit 217 forwards any branch instructions from the instruction stream to BPU 218 for execution. BPU 218 includes a branch prediction mechanism that includes, in one embodiment, a dynamic prediction mechanism such as a branch history table that enables BPU 218 to speculatively execute unresolved conditional branch instructions by predicting whether or not the branch will be taken.

During the decode/dispatch stage, dispatch unit 220 and ISU 221 decode and issue one or more instructions from issue queues 222 to execution units 223, 228, and 230, typically in program order. ISU 221 may allocate a rename buffer within GPR rename buffers 233 or FPR rename buffers 237 for storing the result of each dispatched instruction. In addition, instructions (or instructions identifiers or tags representative of the instructions) may be stored within the multiple-slot completion buffer (the completion table) of completion unit 240 as a means of tracking which instructions have completed in an out-of-order embodiment.

During the execute stage, execution units 223, 228, and 230 execute instructions issued from ISU 220 opportunistically as operands and execution resources for the indicated operations become available. In one embodiment, each of execution units 223, 228, and 230 are equipped with a reservation station that stores instructions dispatched to that execution unit until operands or execution resources become available. After execution of an instruction has terminated, execution units 223, 228, and 230 store data results, if any, within either GPRs or FPRs, depending upon the instruction type. In the depicted embodiment, execution units 223, 228, and 230 notify completion unit 240 which instructions have finished execution. Finally, instructions are completed in program order out of the completion table of completion unit 240. Instructions executed by FXU 223 and FPU 230 are completed by transferring data results of the instructions from GPR rename buffers 233 and FPR rename buffers 237 to GPRs 232 and FPRs 236, respectively.

Processor 101 supports out-of-order speculative instruction execution. Instructions may be speculative on a predicted branch direction or speculative beyond an instruction that may cause an interrupt condition. In the event of a branch misprediction or an interrupt, hardware automatically flushes undesired instructions from the pipelines and discards undesired results, presenting the effect of precise exceptions and sequentially executed instructions down the appropriate branch paths. Incorrect speculative results are selectively flushed from all units in one clock cycle, and instruction issue can resume the following clock cycle. Processor 101 may include multiple load units and a single store unit. However, it should be clear to one skilled in the art that processor 101 could comprise other configurations such as a single load/store unit, etc.

When an instruction is issued, the ISU 221 tags the instruction in such a manner that relative age between any two instructions can be easily determined. In one embodiment, sequential instructions are tagged with sequential integer (ITAGs). In addition to providing a mechanism for determining the issue order and relative age of issued instructions, ITAGs 106 provide a shorthand representation of their corresponding instructions. The ITAG value of each instruction is associated with queue entries and pipeline stages in which it resides. The use of ITAGs facilitates an instruction flush mechanism (in response to a processor-generated flush instruction) in which a magnitude comparison between the ITAG associated with the flush instruction and the ITAG associated with a particular queue entry or functional unit stage is performed and the entry invalidated if it is for an instruction which is as young or younger than (i.e., issued simultaneously or after) the flushed instruction. All remnants of the flushed instruction (and all subsequent instructions) are "flushed" from the machine and the fetch unit is redirected to the fetch starting at the address of the "flushed" instruction.

Figure 3:
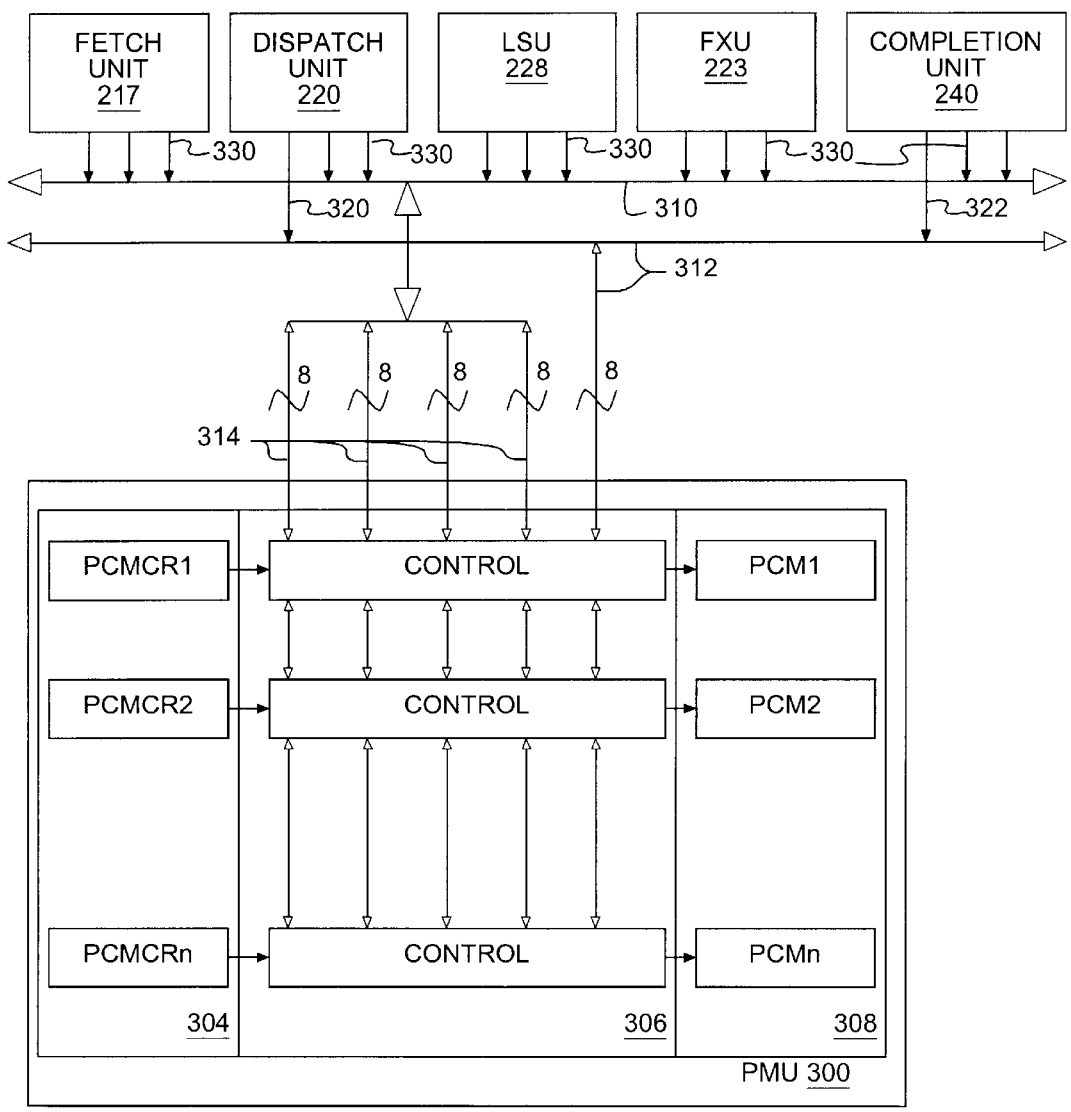
FIG. 3 is a block diagram of selected features of the processor of FIG. 1 emphasizing a performance monitor unit.

Referring now to FIG 3, each processor 101 according to the present invention includes a performance monitor unit (PMU) 300. PMU 300 is configured to detect and record the occurrence of specified events that occur in the execution units and other functional units of processor 101 described above relative to FIG 2. The event may result in the generation of an event signal that indicate, a specific operation has occurred in a unit of processor 101.

As depicted in FIG. 3, PMU 300 includes a set of control registers 304, control circuitry 306 that is connected to the control registers 304, and a set of performance monitor counters 308. The number of control registers and performance monitor counters is implementation specific, but is typically in the range of four to sixteen counters. Typically, the performance monitor counters 304 are preferably individually programmable via software to specify the event that is associated with (i.e., monitored by) a particular counter.

In a conventionally implemented performance monitor unit, a cross-bar switch may be employed to enable each event capable of being monitored to be associated with each of the available performance monitor counters. The crossbar switch design was acceptable when the number of events that were capable of being monitored was relatively small. With the advent of superscalar processors, however, the increased number of execution units and increased complexity in the memory hierarchy has resulted in a proliferation in the number of events that system designers want to monitor. Unfortunately, serious constraints on the die size of processor 101 prevent the indiscriminate use of cross bar switches in the performance monitor unit.

To control the size of the circuit required to implement a suitable performance monitor unit, the PMU 300 depicted in FIG. 3 categorizes the number of events capable of being monitored into a set of direct events and indirect events. Direct events represent high priority events, such as the dispatch or completion of an instruction, that must be available to PMU 300 at all times. In the preferred embodiment, direct event signals, each of which indicates the occurrence of a corresponding direct event, are routed directly to PMU 300 via a dedicated wire. The set of direct event wires required to route direct events to PMU 300 is represented in FIG. 3 by reference 312. The depicted embodiment of PMU 300 includes a set of eight direct event wires 312 and is capable of monitoring a maximum of eight direct events. FIG. 3 illustrates an exemplary direct event 320, which may represent and instruction dispatch event, issuing from dispatch unit 220, and an exemplary direct event 322, which may represent an instruction completion event, issuing from completion unit 240.

Processor 101 according to one embodiment of the present invention connects indirect event signals to PMU 300 via a shared or multiplexed bus indicated in FIG. 3 by reference numeral 310. Using shared bus 310 to carry indirect event signals beneficially reduces the number of interconnects or wires that must be routed to PMU 300 thereby saving valuable die size. Exemplary indirect events, indicated by reference numeral 330, are illustrated issuing from fetch unit 217, dispatch unit 220, LSU 228, FXU 223, and completion unit 240.

The functional units of processor 101 may include multiplexing circuitry that controls which of the indirect event signals is connected to shared bus 310 at any given time. Thus, in one embodiment, shared bus 310 may carry indirect event signals generated by fetch unit 217 when fetch unit 217 is the master of shared bus 310 (i.e., the bus master) while carrying indirect event signals generated by fetch unit 220 when fetch unit 220 is the bus master. In addition, it will be appreciated that the spirit and scope of the present invention encompasses other functional units (not depicted in FIG. 3) that may generate indirect event signals which are multiplexed onto shared bus 310. Moreover, the multiplexing of indirect event signals onto shared bus 310 need not be constrained to multiplexing per functional unit. In another embodiment, for example, the indirect event signals from all of the various units of processor 101 may be classified into functional groups. The functional groups may include indirect event signals that provide information relative to a particular performance attribute of processor 101. The multiplexing logic in each of the functional units may be implemented such that the indirect event signals in one or more functional groups are connected to shared bus 310 simultaneously.

In one embodiment of processor 101, the shared bus 310 is implemented as a 32-bit bus that is logically divided into four sub-divisions or "byte lanes" (each indicated by reference numeral 314) of eight bits each. Byte-lanes 314 may be selectively provided to the performance monitor counters 308 of PMU 300 to further reduce the number and complexity of the wires required to implement the design of PMU 300 within a given (and limited) area. Thus, as an example, a first byte lane 314 may be provided to a first, fourth, fifth, and eighth performance monitor counters 308 (via their corresponding control units 306) while a second byte lane 314 is provided to second, third, sixth, and seventh performance monitor counters (via their corresponding control units 306).

Figure 4:
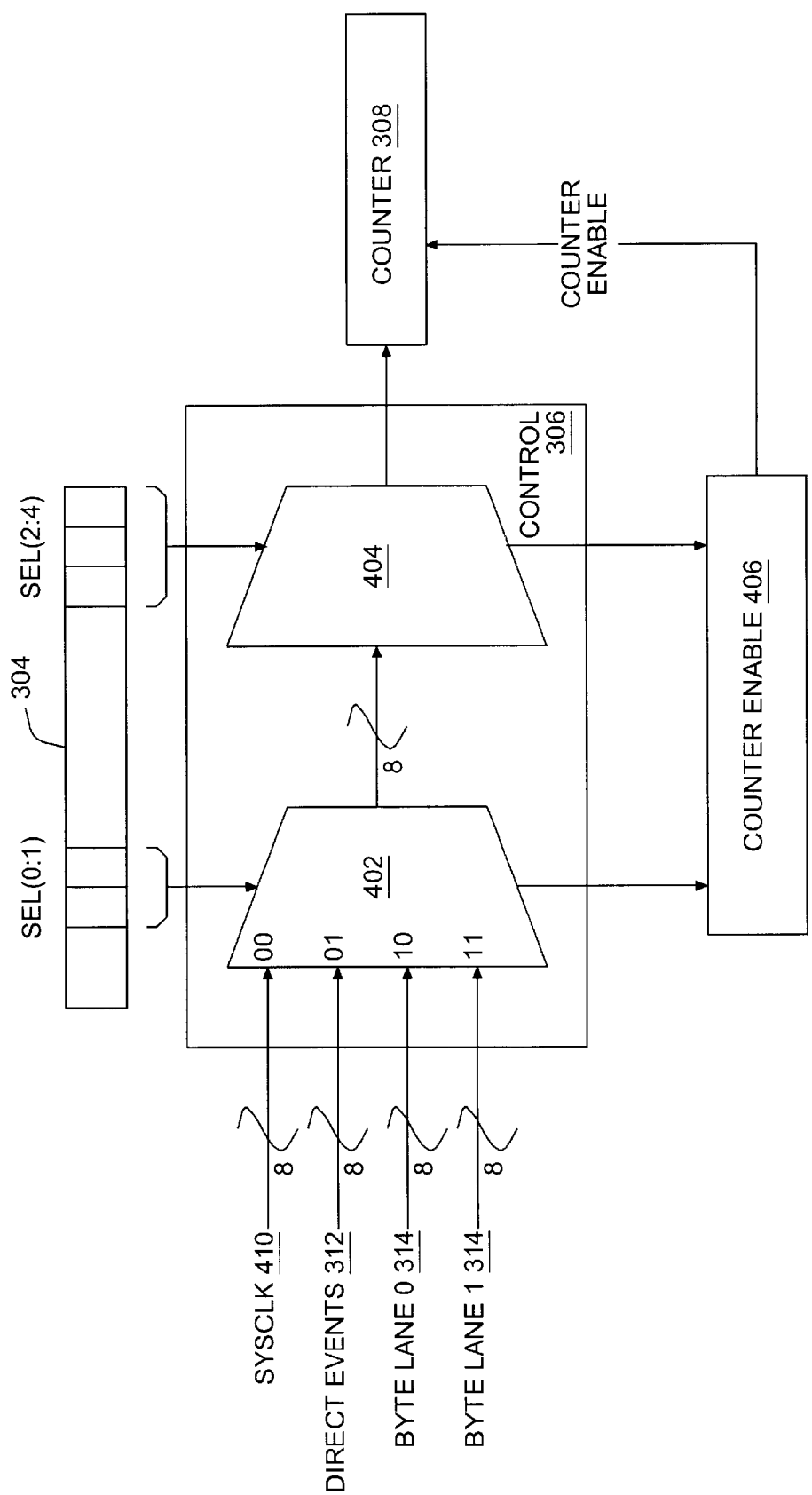
FIG. 4 is a block diagram of selected features of the performance monitor unit of FIG. 3.

Turning now to FIG. 4, additional detail of portions of PMU 300 are illustrated. In FIG. 4, a single performance monitor counter 308 of PMU 300 is depicted with its corresponding control register 304 and control circuit 306. In this embodiment, each control circuit 306 includes a two-tiered hierarchy of event signals from which the signal that drives the corresponding performance monitor counter circuit is selected using a pair of multiplexers 402 and 404. In the depicted embodiment, the first multiplexer 402 is configured to select eight events signals from among the events signals received by the monitor unit based on the state of a pair of select bits, SEL(0:1), in performance monitor register 304. In the depicted embodiment, first multiplexer 402 receives eight bits from direct event wires 312, eight bits from a first byte lane 314, eight bits from a second byte lane 314. In this embodiment, the state of SEL(0:1) in performance monitor control register 304 determines whether the direct event signals, the indirect event signals on the first byte lane, or the indirect event signals on the second byte lane are forwarded to the second multiplexer 404.

By routing only three 8-bit signal sets to first multiplexer 402, the PMU 300 according to one embodiment of the present invention reserves the fourth state attainable by select bits SEL(0:1) for special purpose uses. In one embodiment of the present invention, the fourth state of first multiplexer select bits SEL(0:1), namely, the state in which SEL(0:1) is 00 (binary), is used to control a counter disable function and a system clock cycle counter. The system clock cycle counter function, as its name implies, uses performance monitor counter 308 to count clock cycles independent of any performance event. In one embodiment, the system clock counter functionality is achieved by routing a copy of the system clock signal to first multiplexer 402 along with seven dummy signals. The seven dummy signals could, for example, comprise a set of seven wires that are connected to ground. The system clock cycle, along with the seven dummy signals form an 8-bit system clock "bus" identified in FIG. 4 by reference numeral 410 (where the quotation marks emphasize that the 8-bit signal includes only a single bit containing any information). If the select bits SEL(0:1) equal 00, system clock bus 410 is passed through to the second multiplexer 404.

The second multiplexer 404 selects one of eight signals that it receives from first multiplexer 402 and forwards the selected signal to performance monitor counter 308. The selection of one of the eight bits of forwarded from first multiplexer 402 is made based upon the status of select bits SEL(2:4). Using first and second multiplexers 402 and 404 gives PMU 300 great flexibility in routing indirect and direct event signals to performance monitor counters 308.

The select signals SEL(0:4) are also provided to a counter enable circuit 406. The output of counter enable circuit 406 is connected to an enable input of counter 308. If an appropriate state of select inputs SEL(0:4) is detected, the counter 308 is entirely disabled. Disabling counters 308 may be achieved by forcing the counter input circuit to a high impedance state. The use of a counter disable in PMU 300 desirably eliminates potential problems associated with attempting to disable a performance monitor counter by simply forcing the input signal to a DC level.

In one embodiment, the counter enable circuit 406 and the system clock bus 410 are both invoked when the select inputs SEL(0:1) to first multiplexer 402 are 00. If the select inputs SEL(2:4) to second multiplexer 404 are anything other than 111, the counter enable signal output is turned off thereby disabling the performance monitor counter 308. If the select inputs SEL(0:1) are 00 and select input bits SEL(2:4) are 111, the counter enable signal is turned on thereby enabling performance monitor counter 308. (The performance monitor counter signal is also turned on if select inputs SEL(0:1) are any value other than 00). If the select input signals SEL(0:1) are 00, the system clock bus 410 is selected by first multiplexer 402 and forwarded to second multiplexer 404. As indicated previously, seven of the eight signals in system clock bus 410 are simply ground signals while the eighth signal is a copy of the system clock. The system clock signal may be selected by second multiplexer 404 and forwarded to counter 308 when select bits SEL(2:4) are equal to 111 while one of the seven ground signals is selected by second multiplexer 404 if the select bits SEL(2:4) have any value other than 111. In this manner, the counter is disabled by circuit 404 and the input to counter 308 is connected to a grounded signal if SEL(0:4) equals 00XYZ, where XYZ represents any three digit binary number other than 111. The counter 308 is enabled and however and configured to count clock cycles if select bits SEL(0:4) are equal to 00111.

Preferably, the direct event signals 312 are provided to each of the counters 308 in PMU 300. In the illustrated example, however, the indirect event signals in each byte lane 314 are provided only to selected counter 308. This arrangement balances the ability to count certain events (direct events) in each of the available counters during any cycle with the desire to control the size of the circuit used to enable performance monitoring of a large number of indirect event signals.

It will be apparent to those skilled in the art having the benefit of this disclosure that the present invention contemplates a processor and system in which a performance monitor unit designed to provide system users with the ability to monitor a large number of events without requiring direct wiring and cross-bar switches for each signal to be monitored. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A processor suitable for use in a data processing system, comprising:

first and second functional units for processing instructions executable by the processor, each functional unit being enabled to generate a direct event signal and an indirect event signal, wherein each event signal indicates the occurrence of a corresponding instruction processing event in the processor;

a bus shared by the first and second functional units wherein a set of first indirect event signals is connected to the shared bus when the first functional unit is a master of the shared bus and a set of second indirect event signals is connected to the shared bus when the second functional unit is a master of the shared bus; and a performance monitor unit (PMU) including a plurality of performance monitor counters suitable for counting instruction processing events, wherein the PMU is connected to the shared bus and to the set of direct event signals such that, during any selected cycle, each direct event signal may be monitored by at least one of the counters and further wherein at least a portion of the indirect event signals associated with the functional unit that is master of the shared bus may be monitored by at least one of the counters.

2. The processor of claim 1, wherein the performance monitor unit includes a control unit associated with each of the counters, and wherein the control unit selects a signal from the direct event signals and shared bus signals for monitoring.

3. The processor of claim 2, wherein the performance monitor unit includes a set of programmable control registers corresponding to each of the control units, wherein the control registers determine which event signal is selected by the control unit for monitoring.

4. The processor of claim 2, wherein at least one of the control units includes a first multiplexer configured to select, based on the state of a first portion of the corresponding control register, a set of event signals from the direct event signals and shared bus signals received by the PMU.

5. The processor of claim 4, wherein at least one of the control units includes a second multiplexer configured to select a single event signal from the set of event signals selected by the first multiplexer based on a state of a second portion of the control register.

6. The processor of claim 1, wherein the shared bus is logically sub-divided and wherein an indirect event signal from a first sub-division of the shared bus is connectable to a first counter but not to a second counter and wherein an indirect event signal from a second sub-division of the shared bus is connectable to the second counter, but not to the first counter.

7. The processor of claim 1, wherein at least one of the performance monitor counters is further connectable to a system clock of the processor when at least a portion of the corresponding control register is in a predetermined state.

8. The processor of claim 1, wherein a performance monitor counter may be disabled based on the state of a programmable control register associated with the counter.

9. A data processing system including processor, memory, input means, and display, the processor comprising:

first and second functional units for processing instructions executable by the processor, each functional unit being enabled to generate a direct event signal and an indirect event signal, wherein each event signal indicates the occurrence of a corresponding instruction processing event in the processor;

a bus shared by the first and second functional units wherein a set of first indirect event signals generated by the first functional unit is connected to the shared bus when the first functional unit is a master of the shared bus and a set of second indirect event signals generated by the second functional unit is connected to the shared bus when the second functional unit is a master of the shared bus; and a performance monitor unit (PMU) including a plurality of performance monitor counters suitable for counting instruction processing events, wherein the PMU is connected to the shared bus and to the set of direct event signals such that, during any selected cycle, each direct event signal may be monitored by at least one of the counters and further wherein at least a portion of the indirect event signals associated with the functional unit that is master of the shared bus may be monitored by at least one of the counters.

10. The system of claim 9, wherein the performance monitor unit includes a control unit associated with each of the counters, and wherein the control unit selects a signal from the direct event signals and shared bus signals for monitoring.

11. The system of claim 10, wherein the performance monitor unit includes a set of programmable control registers corresponding to each of the control units, wherein the control registers determine which event signal is selected by the control unit for monitoring.

12. The system of claim 10, wherein at least one of the control units includes a first multiplexer configured to select, based on the state of a first portion of the corresponding control register, a set of event signals from the direct event signals and shared bus signals received by the PMU.

13. The system of claim 12, wherein at least one of the control units includes a second multiplexer configured to select a single event signal from the set of event signals selected by the first multiplexer based on a state of a second portion of the control register.

14. The system of claim 9, wherein the shared bus is logically sub-divided and wherein an indirect event signal from a first sub-division of the shared bus is connectable to a first counter but not to a second counter and wherein an indirect event signal from a second sub-division of the shared bus is connectable to the second counter, but not to the first counter.

15. The system of claim 9, wherein at least one of the performance monitor counters is further connectable to a system clock of the processor when at least a portion of the corresponding control register is in a predetermined state.

16. The system of claim 9, wherein a performance monitor counter may be disabled based on the state of a programmable control register associated with the counter.

17. A performance monitor unit of a microprocessor having a set of functional units, the performance monitor comprising:

a counter enabled to count events associated with an input signal provided to the counter; and a control circuit to determine the input to the counter from a set of inputs provided to the control circuit, wherein the control circuit inputs include a set of direct event signals, each direct event signal being indicative of a corresponding event associated with the processing of instructions by the microprocessor; and wherein the control circuit inputs include a shared bus, wherein the shared bus carries a first set of indirect event signals generated by a first functional unit of the microprocessor when the first functional unit is master of the shared bus and the shared bus carries a second set of indirect event signals generated by a second functional unit of the microprocessor when the second functional unit is master of the shared bus, wherein any of the direct input signal signals and any of the indirect signals associated with the master of the shared bus may be selected as the input to the counter during a particular cycle.

18. The processor of claim 17, wherein the shared bus comprises N-bits and wherein the control circuit receives a first subset of the N-bits as its set of indirect signal.

19. The processor of claim 17, further comprising a second control circuit associated with a second performance monitor counter, wherein the second control circuit receives the direct input signals and a second subset of the shared bus as its indirect signals, wherein the first and second subsets differ.

20. The processor of claim 17, wherein the control circuit inputs further include a system clock signal and wherein the performance monitor counter counts system clock cycles when the system clock signal is selected as the input.

* * * * *